May 29, 1962 W. F. COLLISON 3,037,121
ANGULAR VELOCITY AND ANGULAR POSITION MEASUREMENT
Filed May 1, 1959 10 Sheets-Sheet 1

INVENTOR.
WILLIAM F. COLLISON
BY W. E. Beatty
ATTORNEY.

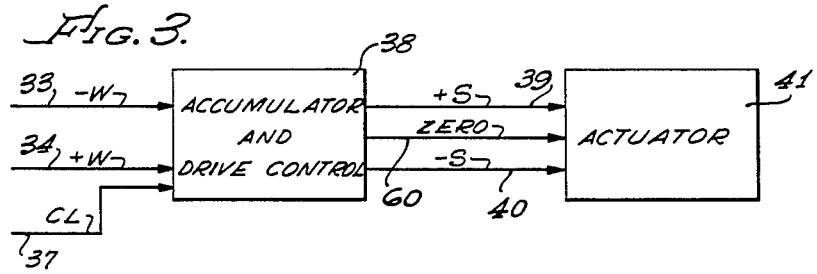
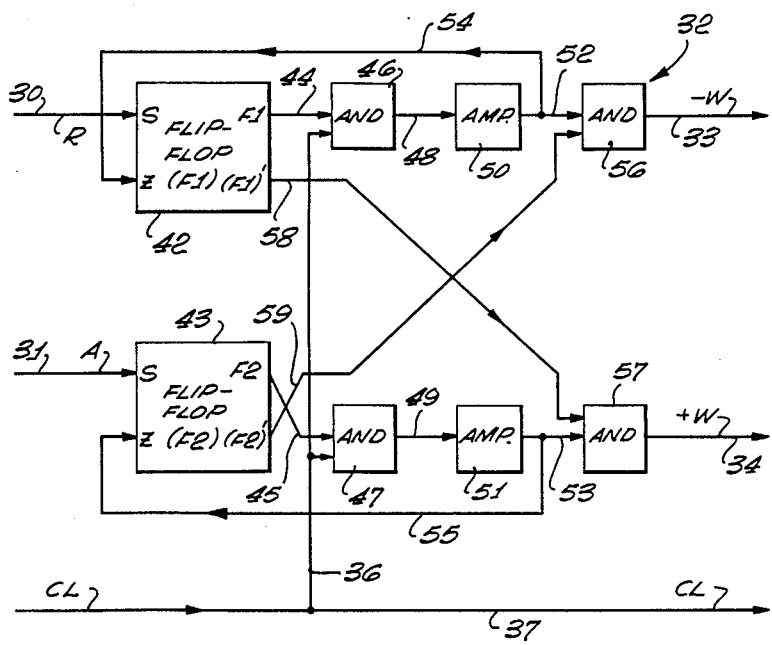

|      | -W    | +W    |
|------|-------|-------|
| -S   | INCR. | DECR. |
| +S   | DECR. | INCR. |
| ZERO | INCR. | INCR. |

| No. | a | b | c | +/0/- | d | e | -W | +W | INCR | DECR |
|-----|---|---|---|-------|---|---|----|----|------|------|
| +7  | 1 | 1 | 1 | +     | 1 | 0 |    |    |      |      |
| +6  | 0 | 1 | 1 | +     | 1 | 0 |    |    |      |      |
| +5  | 1 | 0 | 1 | +     | 1 | 0 |    |    |      |      |
| +4  | 0 | 0 | 1 | +     | 1 | 0 |    |    |      |      |
| +3  | 1 | 1 | 0 | +     | 1 | 0 |    |    |      |      |
| +2  | 0 | 1 | 0 | +     | 1 | 0 |    |    |      |      |
| +1  | 1 | 0 | 0 | +     | 1 | 0 |    |    |      |      |
| 0   | 0 | 0 | 0 | 0     | 0 | 0 |    |    |      |      |
| -1  | 1 | 0 | 0 | -     | 0 | 1 |    |    |      |      |
| -2  | 0 | 1 | 0 | -     | 0 | 1 |    |    |      |      |
| -3  | 1 | 1 | 0 | -     | 0 | 1 |    |    |      |      |
| -4  | 0 | 0 | 1 | -     | 0 | 1 |    |    |      |      |
| -5  | 1 | 0 | 1 | -     | 0 | 1 |    |    |      |      |
| -6  | 0 | 1 | 1 | -     | 0 | 1 |    |    |      |      |
| -7  | 1 | 1 | 1 | -     | 0 | 1 |    |    |      |      |

(1) $-S = e$
(2) $+S = d$
(3) $ZERO = d'e'$
(4) $INCR. = (+S)(-W) + (-S)(+W)$
  $= (d)(-W) + (e)(+W)$
(5) $DECR. = (-S)(+W) + (+S)(-W)$
  $= (e)(+W) + (d)(-W)$
(6) $SET\ d = (ZERO)(+W)$
  $= (d'e')(+W)$
(7) $SET\ e = (ZERO)(-W)$
  $= (d'e')(-W)$
(8) $one = a b' c'$
(9) $ZERO\ d = (one)(DECR.)$
  $= (ab'c')[(e)(+W)+(d)(-W)]$
(10) $ZERO\ e = (one)(DECR.)$ INVENTOR.
WILLIAM F. COLLISON
BY W E Beatty
ATTORNEY.

Fig. 9.
(11) SET $a$ = $a'(INCR.) + a'(DECR.)$
(12) ZERO $a$ = $a(INCR.) + a(DECR.)$
(13) SET $b$ = $b'[a(INCR.)] + b'[a'(DECR.)]$
(14) ZERO $b$ = $b[a(INCR.)] + b[a'(DECR.)]$
(15) SET $c$ = $c'[ba(INCR.)] + c'[b'a'(DECR.)]$
(16) ZERO $c$ = $c[ba(INCR.)] + c[b'a'(DECR.)]$
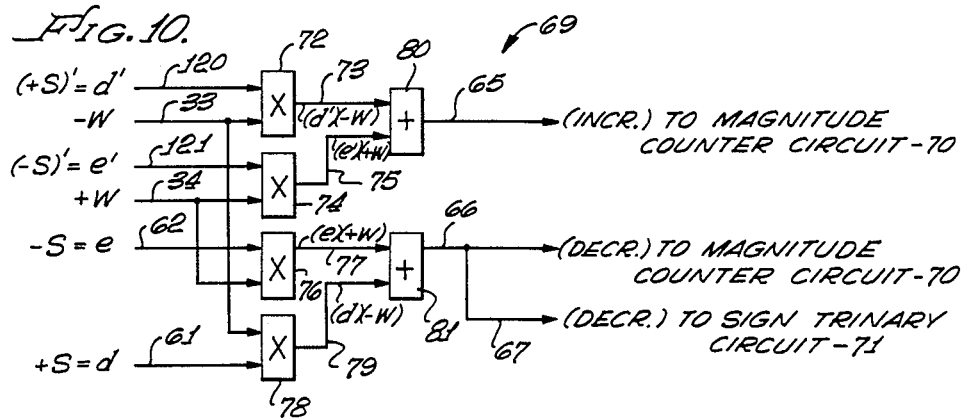
Fig. 10.
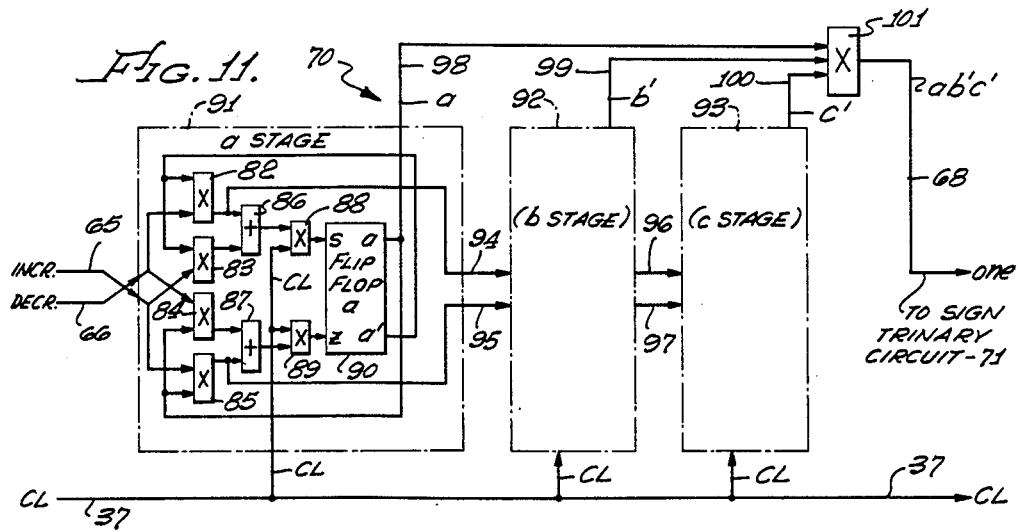
Fig. 11.

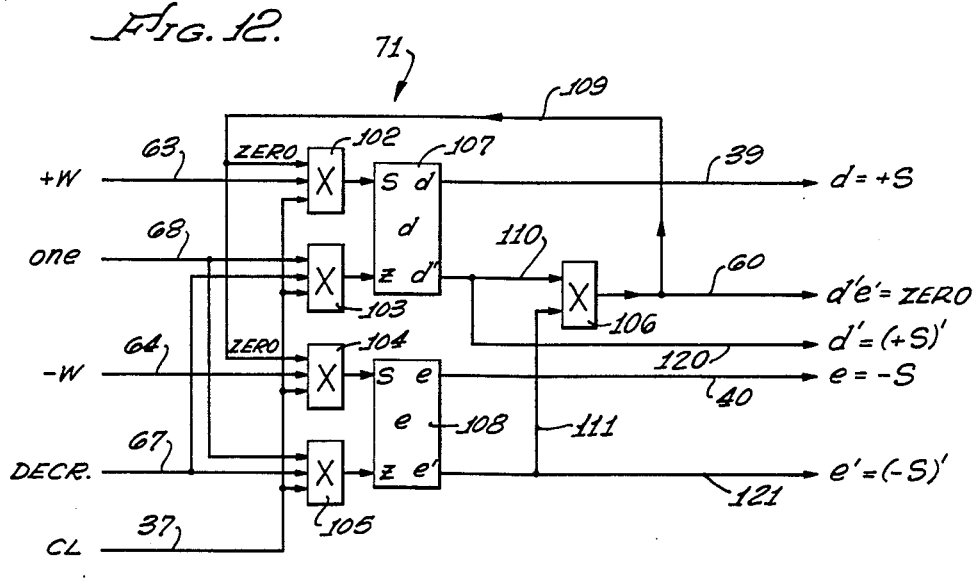

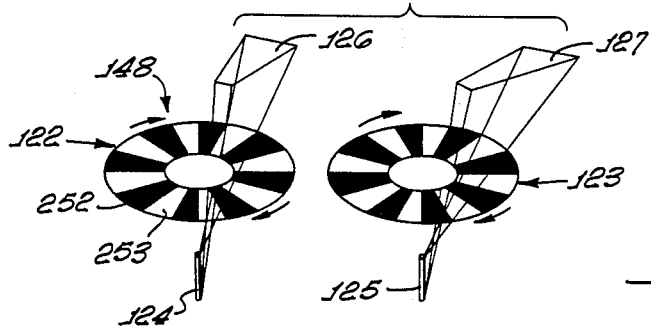
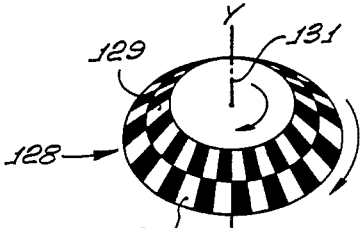
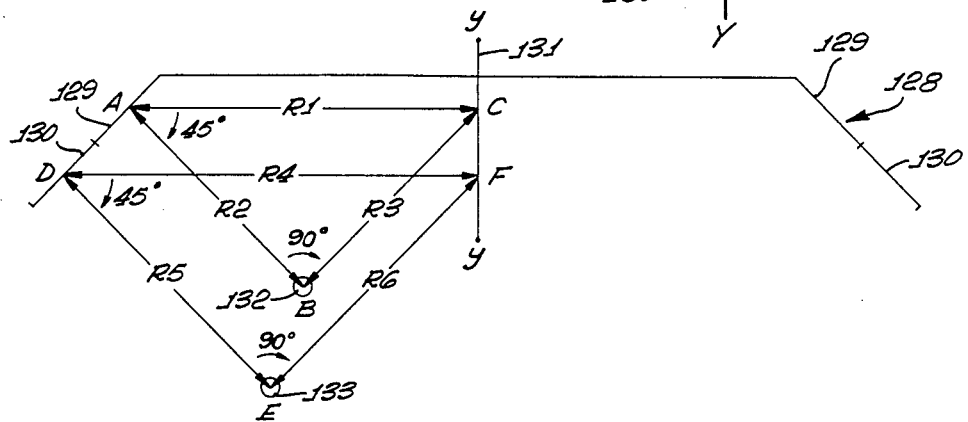
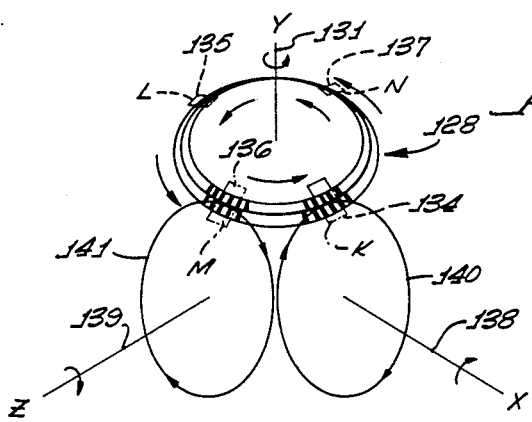
INVENTOR.
WILLIAM F. COLLISON
BY
W E Beatty
ATTORNEY.

INVENTOR.
WILLIAM F. COLLISON
BY
W E Beatty
ATTORNEY.

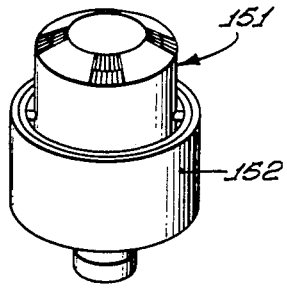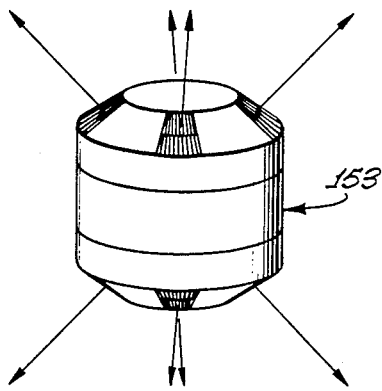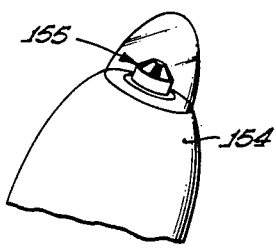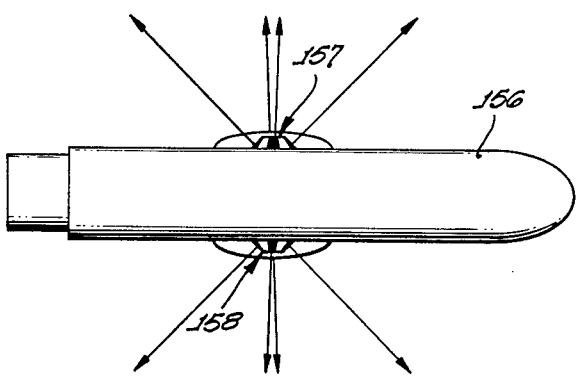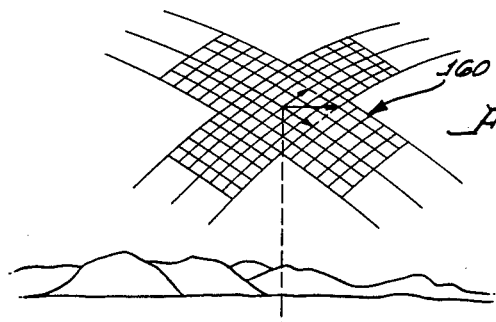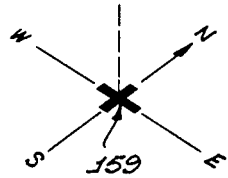

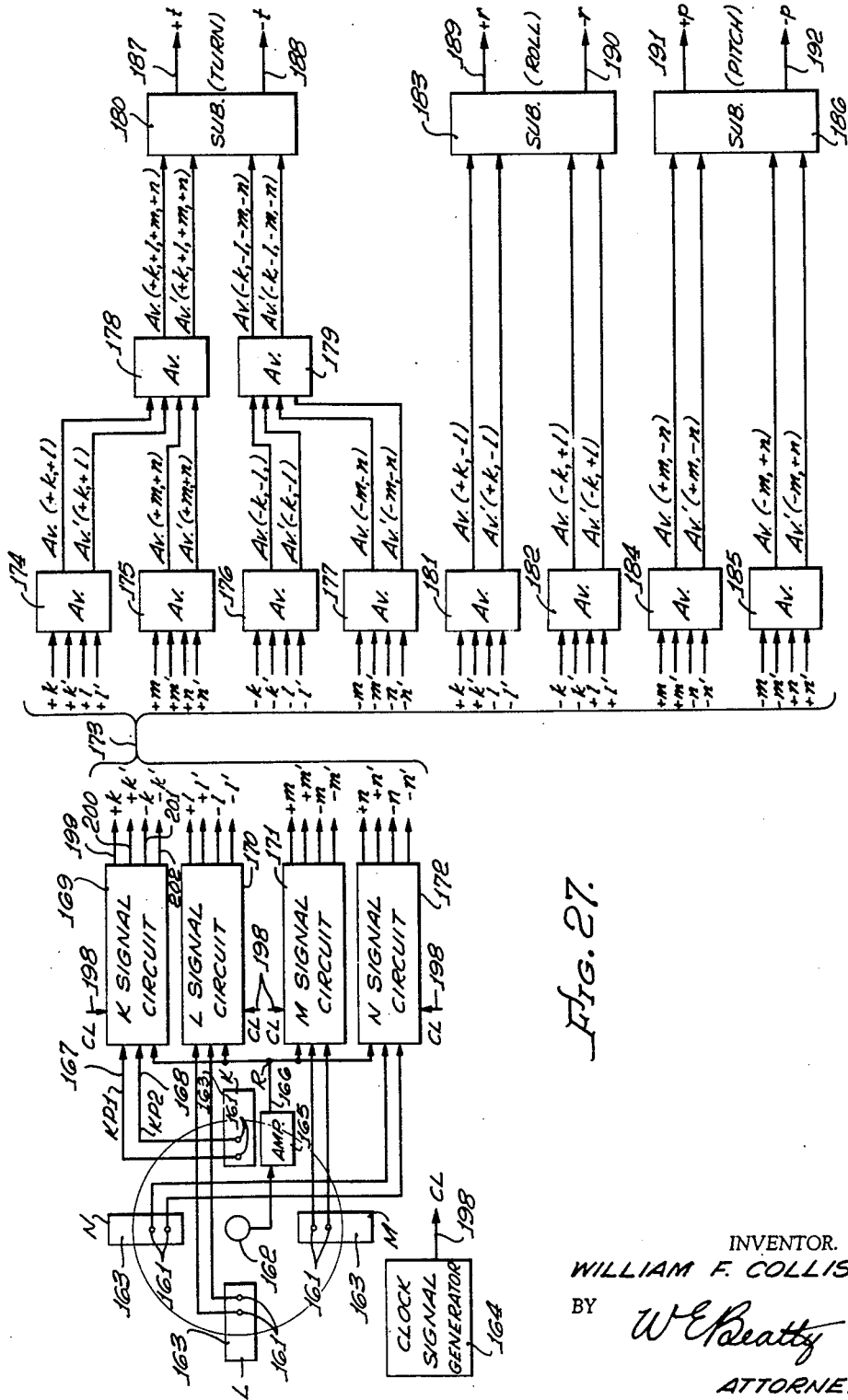

May 29, 1962 W. F. COLLISON 3,037,121
ANGULAR VELOCITY AND ANGULAR POSITION MEASUREMENT
Filed May 1, 1959 10 Sheets-Sheet 10
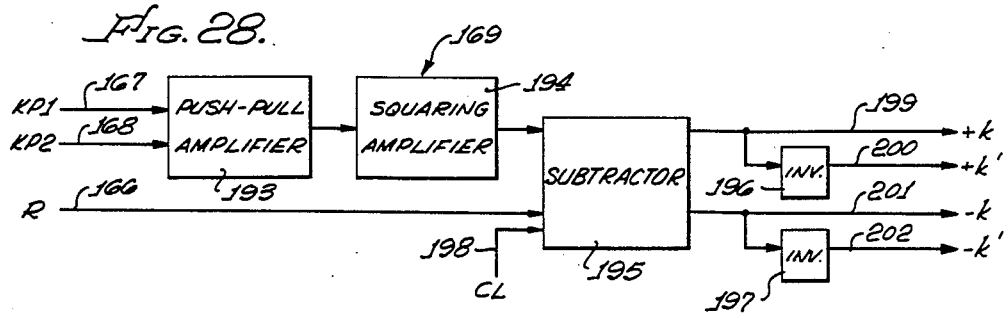
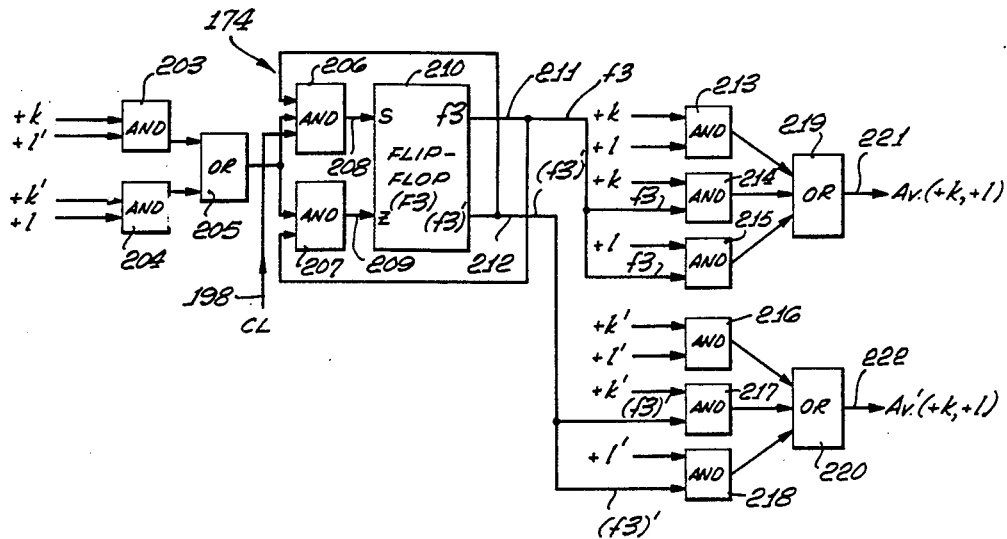
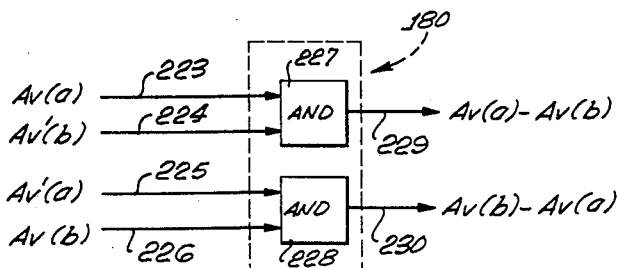
INVENTOR.
WILLIAM F. COLLISON
BY W. E. Beatty
ATTORNEY.

United States Patent Office 3,037,121
Patented May 29, 1962

3,037,121
ANGULAR VELOCITY AND ANGULAR
POSITION MEASUREMENT
William F. Collison, Escondido, Calif.
(183 W. Powers Circle, Apt. 302, Littleton, Colo.)
Filed May 1, 1959, Ser. No. 810,369
21 Claims. (Cl. 250—203)

This invention relates to angular velocity and angular position measurement and has particular application to the measurement of the angular rotation of a body in space.

Specifically, an object of the present invention is to measure the angular velocity of rotation and angular position of an instrument with respect to the "fixed celestial sphere."

A further object of the invention is to measure the roll, pitch, and turn velocity and position of an aircraft or missile instrument with respect to a celestial coordinate system.

The invention may further be used as a ground instrument in tracking of missiles, aircraft, or other bodies. Also as a ground instrument it may be used as an accurate "celestial clock" or time standard.

As an element in control systems, this invention may be used whenever the above measurements are useful as control inputs.

The usefulness of the present invention and the scope of its applicability may be evaluated by comparing it with other systems having a similar purpose.

It is well known to the missile and aircraft guidance and control art that a stable directional reference system is necessary for making measurements needed as control inputs for the proper application of control outputs to direct the application of the power which influences the motion of the craft.

Two main means of establishing a stable reference system are by use of gyroscopes or by telescopic sighting upon the "fixed" stars. When the instrument is mounted on the ground and not subject to acceleration as in a missile, a bubble level or a plumb bob are also used to determine the "true" vertical to the earth.

The main difficulty with a gyroscope is that it is subject to unpredictable drift.

The main difficulty with telescopic sighting on the fixed stars is that it is difficult to "latch-on" to the desired stars and also difficult to keep the telescope servoed onto the stars during rapid rotational motion of the craft.

The bubble level and plumb bob are of only limited use in space where acceleration forces cannot be separated from forces due to gravitational attraction.

Radio directional means are also used but these have the disadvantage of low accuracy, and further they generally violate the requirements for "radio-silence" that are important in military operations.

The present invention has none of the difficulties mentioned above. An instrument according to the present invention is not subject to drift; it is not affected by acceleration or gravitational forces; it does not depend upon radio type signals and does not violate "radio-silence"; it does not present the difficulties of latching on to particular stars nor of keeping particular stars in telescope fields. Further, the system is one of inherently high accuracy and dependability.

A further object of the present invention is to provide method and means of measuring the angular rotational velocity of a craft with reference to the celestial sphere.

Another object is to provide method and a means of accumulating the total angular rotational displacement of a craft from its original orientation with respect to the celestial sphere.

Another object is to provide method and means of controlling the platform upon which the instrument is mounted so as to cause it to maintain a generally fixed orientation with respect to the celestial sphere or to cause it, when displaced angularly, to return to its original orientation.

A further object is to provide stable reference information with respect to angular motion around three coordinate axes.

A further object is to provide method and means of making said measurements and providing said control information with high accuracy and dependability.

FIG. 3 is a block diagram showing the accumulator and drive control and the actuator.

FIG. 4 is a logical block diagram of the subtractor of FIG. 2.

Figures 5, 6, 7, 8:
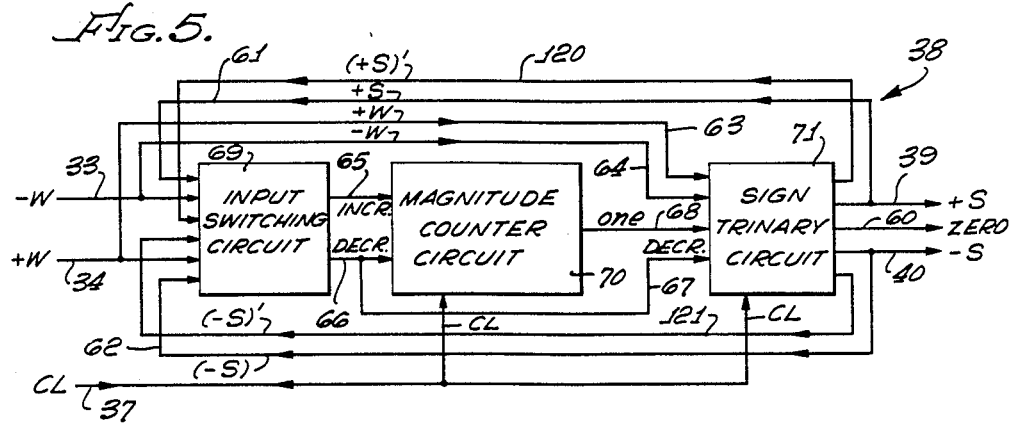
FIG. 5 is a block diagram of the accumulator and drive control of FIG. 3.
FIG. 6 is an input-output table for the input switching circuit of FIG. 5.
FIG. 7 is an input-output table for the magnitude counter circuit and the sign trinary circuit of FIG. 5.

FIG. 8 gives some of the logical equations for the accumulator and drive control of FIG. 5.

FIG. 9 gives the logical equations for the magnitude counter circuit of FIG. 5.

FIG. 10 is a logical block diagram of the input switching circuit of FIG. 5.

FIG. 11 is a logical block diagram of the magnitude counter circuit of FIG. 5.

FIG. 12 is a logical block diagram of the sign trinary circuit of FIG. 5.

Figure 1:
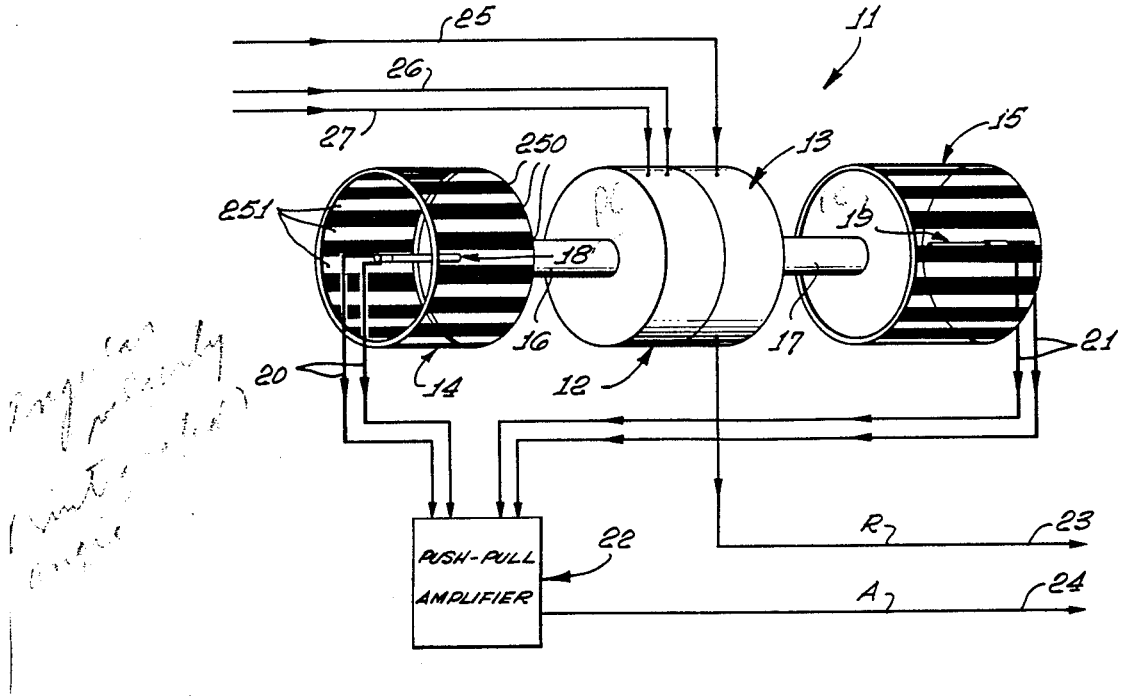
FIG. 1 is a perspective view of a scanning mechanism according to the present invention.

FIG. 13 is a block diagram of the actuator of FIG. 3 showing also the platform drive connection and the instrument platform as well as the scanning mechanism of FIG. 1 and the instrument cable.

FIG. 14 is a perspective diagram showing the general arrangement of a scanning mechanism which may be used to measure "turn" of a craft using a vertical view of the heavens.

FIG. 15 is a perspective view of a scanning grid which may be used in a system to measure roll, pitch, and turn simultaneously.

FIG. 16 is a side view cross-sectional diagram explaining the placement of photocells in a scanning mechanism using the type of grid shown in FIG. 15.

FIG. 17 is a perspective diagram further explaining a scanning mechanism for measuring roll, pitch, and turn by means of a grid as shown in FIG. 15.

Figure 18:
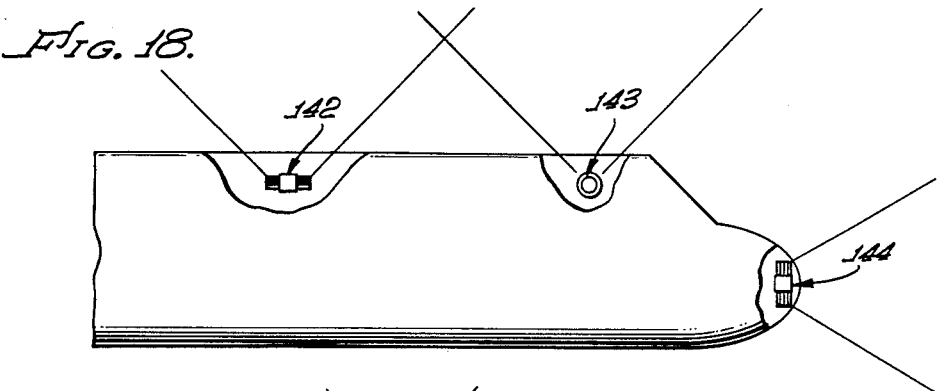

FIG. 18 is a side view representation of an aircraft cutaway to show positioning of three scanning mechanisms like FIG. 1 for the purpose of measuring roll, pitch, and turn.

Figure 19:
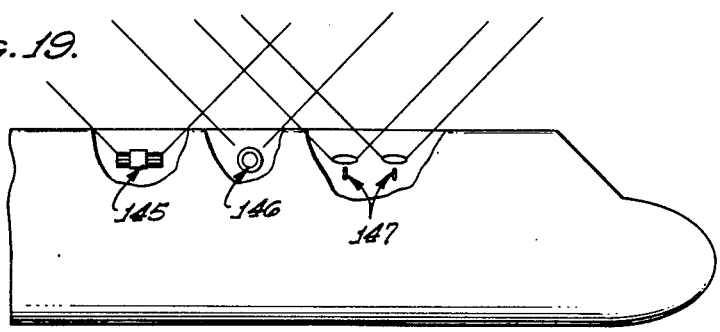

FIG. 19 is a side view representation of an aircraft cutaway to show positioning of two scanning mechanisms like FIG. 1 for measuring roll and pitch, and one scanning mechanism like FIG. 14 for measuring turn.

Figure 20:
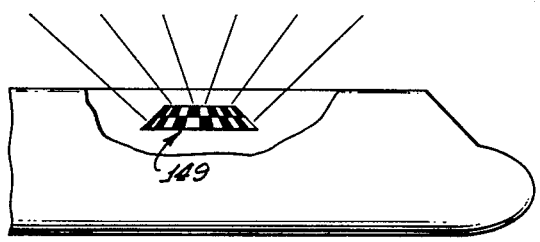

FIG. 20 is a side view representation of an aircraft showing positioning of a single scanner as explained in FIGS. 15, 16, and 17 for measuring roll, pitch and turn.

Figure 21:
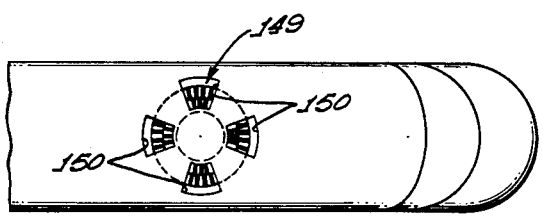

FIG. 21 is a top view representation of an aircraft showing four "windows" through which a scaner like that in FIG. 20 may view the heavens for measuring roll, pitch, and turn.

FIG. 22 is perspective illustration of a combination scanning mechanism hung in gimbals so as to permit it to be oriented in any desired direction around three axes of motion.

FIG. 23 is a perspective illustration of a double combination scanning mechanism which is capable of adequate view in all directions to permit desired measurements around all axes regardless of the orientation of the instrument with respect to the earth. A typical use would be in a satellite.

FIG. 24 is a perspective view showing a gimbal mounted scanning mechanism like FIG. 22 located in a nose section of a missille where generally forward viewing is desired.

FIG. 25 is a side view diagram of a missile showing combination scanning mechanisms mounted above and below so as to provide the same viewing benefits as the double combination unit shown in FIG. 23.

FIG. 26 is a perspective illustration of the operation of a pair of scanning mechanisms mounted on the earth to detect motion relative to the earth.

FIG. 27 is a block schematic diagram of a combination system for generating signals representing turn, roll, and pitch.

FIG. 28 is a block schematic diagram of the K signal circuit 169 of FIG. 27.

FIG. 29 is a logical block schematic diagram of the averager 174 of FIG. 27.

FIG. 30 is a logical block schematic diagram of the subtractor 180 of FIG. 27.

*General System*

Figure 2:
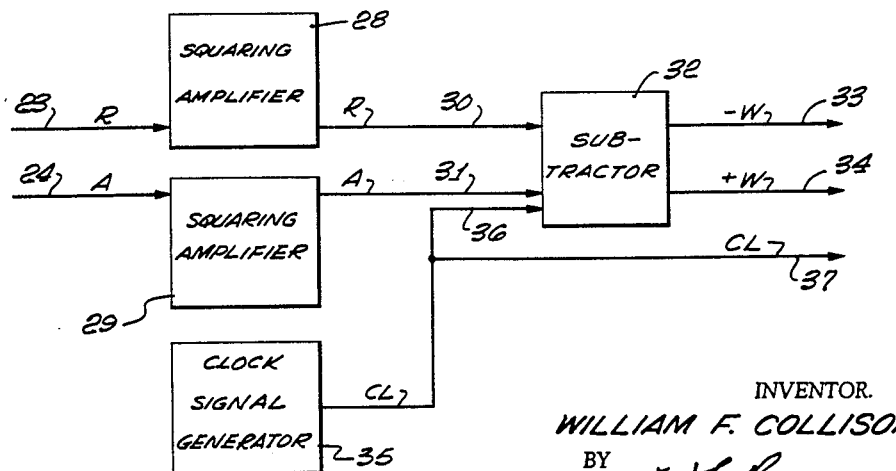
FIG. 2 is a block diagram of the signal shaping, subtracting and synchronizing system which receives its inputs from the scanning mechanism of FIG. 1.

In order to first obtain a general understanding of the present invention, reference may be made to FIGS. 1, 2, and 3 and also to FIG. 13.

The scanning mechanism 11 of FIGS. 1 and 13 is to be so mounted as to have clear view above of the stars. The first scanner 14 is essentially a cylinder having a surface composed of alternately opaque and transparent strips, i.e., masks indicated at 250, and slits indicated at 251. The first photocell 18 thus views strips of the celestial sphere corresponding to the transparent strips of the first scanner 14. The second scanner 15 is similar to the first except that its strips are offset from those of the first scanner so that opaque strips of the second scanner 15 align with transparent strips of the first scanner 14, and transparent strips of the second scanner 15 align with opaque strips of the first scanner 14. Thus the second photocell 19 views strips of the cellestial sphere corresponding to transparent strips of the second scanner 15 which in turn correspond to the opaque strips of the first scaner 14. Thus the first photocell 18 and the second photocell 19 view alternate strips of the celestial sphere.

Because of the fact that the stars are not uniformly distributed over the celestial sphere, the light gradient over the celestial sphere is irregular. For this reason, the total amount of light from the stars falling upon the first photocell 18 will almost always be different from the total amount of light falling on the second photocell 19.

To explain the operation, let it be assumed that at one moment the first photocell 18 receives the greater amount of light. Now if the scanners are both rotated on their drive shafts 16 and 17 through an angle equal to that subtended by one strip of the scanners 14, 15, the situation will be reversed and the second photocell will now receive the greater amount of light because the areas of sky viewed by the two photocells will be reversed.

Although the operation of the scanning mechanism within the lower levels of the atmosphere will ordinarily be effective only at night, it should be noted that at high enough altitudes or with sufficiently selective photocells and optical elements the system will also be operable during the daylight especially during mornings and evenings.

The scanners 14 and 15 are rotated by motor 12 and the outputs 20, 21 of photocells 18 and 19 provide the inputs to the push-pull amplifier 22. Thus as the scanners rotate, the signal (A) on amplifier output line 24 will be a cyclic signal having a frequency which is directly proportional to the rate of rotation and to the number of strips of the scanner cylinders. This signal (A) is thus a measure of the total angular velocity of the scanners 14, 15 about their axis of rotation, and this total in turn is the sum of the angular velocity of the drive relative to craft and the angular velocity of the craft itself around the same axis.

Now the angular velocity of the drive is measured by digitizer 13 which provides a cyclic signal (R) via digitizer output line 23. The frequency of this signal is proportional to the angular velocity of the drive relative to the craft. Thus the difference between (R) and (A) represents the angular velocity of the craft itself around the scanner axes of rotation.

The cyclic signals (R) and (A) lines 23 and 24 are converted to square wave signals by squaring amplifiers 28 and 29 respectively, and then subtracted by subtractor 32, as shown in FIG. 2 to give the clocked outputs (−W) and (+W), lines 33 and 34 respectively. The frequency of the (−W) signal is equal to the difference $(R)-(A)$ and is proportional to craft rotation in a direction opposite to that of the scanner drive. The frequency of the (+W) signal is equal to the difference $(A)-(R)$ and is proportional to craft rotation in the same direction as the scanner drive. The basic equation is $$W = A - R$$

and if A is greater than R then W is positive; whereas if R is greater than A then W is negative, hence $$(+W) = A - R \quad (A \text{ greater than } R)$$

and $$(-W) = R - A \quad (R \text{ greater than } A)$$

A pulse on the (+W) line 33 thus represents an increment of craft rotation in the positive direction whereas a pulse on the (−W) line 34 represents an increment of craft rotation in the negative direction. We will consider rotation in the same direction as the scanner drive to be positive rotation.

Thus the frequencies of these two signals (+W) and (−W) represent the angular velocity of the craft in space. As such, these signals may serve as inputs to data processing or control systems, navigation systems, and stabilization systems.

One method of utilizing the above signals is further illustrated in FIG. 3. Since the (+W) and (−W) pulses represent positive and negative increments of rotation, an accumulator or counter 38 capable of receiving positive and negative inputs may be used to register total accumulated angular displacement from an original reference position. If the accumulator is one which registers both the magnitude and the sign of the count, the sign stage may be used to control an actuator 41 to drive the craft or the instrument platform 113 back to its original reference position. Such is the purpose of the accumulator and drive control 38 and the actuator 41 of FIG. 3.

FIG. 13 shows the actuator 41 connected to the instrument platform 113. It will be noticed that in the illustrative system the zero position of the accumulator 38 is used to activate the braking control 117 of the actuator 41 via zero line 60 so as to stop the drive. For this reason, it should be noted also that when the counter 38 is in its zero condition, neither positive nor negative drive signals (+S) nor (−S), lines 39 and 40, are generated since it is not desirable that these signals should activate the drive in opposition to the brake.

The overall system as shown in FIGS. 1, 2, 3 and 13 thus operates in general as follows: A rotation of the craft in the positive direction produces (+W) pulses which are counted to indicate a positive angular displacement. The sign (+S) of this positive displacement activates the reverse drive relay 116 of the actuator 41 causing the actuator to drive the platform 113 in the negative direction. The negatively driven rotation of the platform 113 thus produces (−W) pulses which subtract from the accumulated count in the accumulator 38 until the count registered is reduced to zero, the zero signal line 60, then activates the braking control relay 117 to stop the platform 113 at its initial reference or null position. Conversely, for an initial rotation in the negative direction, (−W) pulses on line 33 would cause a negative count whose sign would activate the forward drive control relay 118 of the actuator 41 causing forward rotation of the platform 113 and result in generation of (+W) pulses until the count is reduced to zero at which time the zero condition would again activate the braking control relay 117, to operate the brake not shown, and cause the platform to stop at its initial reference position.

It may be noted that the above system makes it desirable that the actuator 41 be capable of driving the instrument platform 113 at a speed greater than the maximum roll speed which might occur for a given craft about the axis in question.

*Detailed Description*

Some constants are assumed for purpose of explanation. The scanning mechanism 11 of FIG 1 will be discussed first. In the illustrative system, the scanners 14 and 15 of FIG. 1 will be considered to have a radius of, say approximately 5.73 inches or a circumference of 36 inches. Thus one degree corresponds to one-tenth inch of circumference. Also there are to be, say 1000 opaque strips, indicated at 250, per inch of circumference or 100 strips per one-tenth inch. (For clarity fewer strips are shown in the drawing of FIG. 1). Hence one degree of rotataion will be represented by 100 cycles of signal (A) line 24, or one cycle will represent one hundredth of a degree of rotation.

The coaxial scanners 14 and 15 are mounted on drive shafts 16 and 17 which are driven by motor 12, powered by supply lines 26 and 27, at a speed of say 10 revolutions per second. With a scanner circumference of 36 inches and 1000 opaque strips per inch, there will be 36,000 strips around the entire circumference. At 10 revolutions per second this will result in a frequency of 360,000 cycles per second (360 kc.) for signal (A) line 24. If the roll rate of the craft itself should be as high as one revolution per second, the total frequency would be only 396,000 cycles per second. Allowing a reasonable margin, a maximum expected frequency of 500,000 cycles per second is adequate. This frequency is well within the range of practicability for the digital electronic circuits to be used.

The digitizer 13, whose input power is supplied by line 25, is driven by motor 12 at the same speed as the scanners 14, 15. It may be any of several types such as the type utilizing a rotating glass disc etched with opaque lines which interrupt a beam from a light source to a photocell, the type using a magnetic drum or disc having magnetized segments which pass a pick-up head, or the inductive coupling type such as the Farrand Inductosyn. Regardless of the type, it is only necessary that the digitizer 13 produce 36,000 pulses per revolution. With a circumference of 36 inches this would be 1000 pulses per inch with a surface speed, at 10 revolutions per second, of 360 inches per second which is again within a practical range. The digitizer output signal (R) is produced on line 23, and will normally be 360,000 c.p.s.

The photocells 18 and 19 are mounted centrally and axially within the scanners 14 and 15. Since the photocells do not rotate, they need only be responsive to light generally from above. The photocells may be of any type having reasonably high sensitivity and fast response. It is also desirable that the photocells should be nearly as long as the scanners and as narrow as possible preferably less than a scanner strip width, to avoid what might be called a "penumbra" effect which would reduce somewhat the output signal amplitude. The bottom of the photocells 18, 19 is shielded from light by an opaque material and the edges and interior of the scanners are finished with a dull black non-reflecting surface, as are all neighboring parts, to prevent deleterious effects of spurious reflected light. The ends of the scanner cylinders are to be shielded to prevent entry of light there. The signals from photocells 18 and 19 are respectively conducted by line pairs 20 and 21 to the push-pull amplifier 22 which provides as its output the amplified signal (A) line 24. The push-pull amplifier 22 not only amplifies the signal but also serves to cancel out the effect of ambient light level.

As shown in FIG. 2 the (R) signal, line 23, and the (A) signal, line 24, are further amplified and squared by the squaring amplifiers 28 and 29 respectively. The square wave signals have the same frequency as the original inputs to the squaring amplifiers. These square wave signals are supplied by lines 30 and 31 for (R) and (A) respectively to the subtractor 32.

The clock signal generator 35 supplies clock pulses (CL) also via line 36 to the subtractor 32 to serve as a synchronizing signal. The clock signal generator may be any suitable source of square wave pulses at a fairly constant frequency of approximately 500,000 cycles per second since the clock frequency should be greater than or equal to the highest frequency of the data signals.

Since the craft may rotate either in the same direction as the scanner drive 16, 17 or in the opposite direction, the angular velocity (W) of the craft may be either positive or negative. For this reason, the subtractor 32 has been designed to provide for two outputs, (+W) line 34 and (−W) line 33. For craft rotation in the same direction as the scanner drive 16, 17, the pulse rate (+W), line 34, will be proportional to the angular velocity and the pulse rate (−W) will be zero. For craft rotation in the opposite direction, the pulse rate (−W) will be proportional to the angular velocity and the pulse rate (+W) will be zero. This satisfies the equation, $$W+R=A$$

or $$W=A-R$$

where (W) equals the craft rotational velocity, (R) equals the drive velocity, and (A) equals the total resultant velocity of the scanners relative to the celestial sphere. Where (A) is greater than (R), (W) will be positive, (+W). Where (R) is greater than (A), (W) will be negative, (−W).

For an understanding of the detailed logical operation of the subtractor 32, reference may be made to FIG. 4.

The flip-flops (F1) and (F2), 42 and 43 of FIG. 4 are ordinary two-input flip-flops which change condition only on the declining edge of an input signal. Such a signal on the "set" input (marked $s$) of a flip-flop turns the flip-flop "on" and causes the "normal" output to be high (i.e. at its higher voltage level) and the "prime" output marked with prime symbol (′), to be low. A signal on the "zero" input (marked $z$) turns the flip-flop "off" and causes the "prime" output to be high and the "normal" output to be low.

The "and" circuits 46, 47, 56 and 57 are diode "and" gate circuits, or the logical equivalent, such that the output will be high when and only when both (or all) of the inputs are high.

The amplifiers 50 and 51 are peaking amplifiers having regeneration such that when the input signal voltage on lines 48, 49 exceeds a threshold level the output level rises to saturation and then returns to zero until the next input signal exceeding the threshold arrives. The circuit for this purpose could, for example, be a one-shot multivibrator, a shock-excited oscillator used as a peaker, or an externally triggered blocking oscillator. The use of this type of amplifier is appropriate when a signal of varying strength is to activate two circuits which may have slightly different input threshold levels, and when it is important that either both or neither of the two circuits should be triggered as the result of the original signal. In other words we wish to prevent one circuit from being triggered but not the other. Hence the peaking amplifiers 50, 51 are used, and if the signal is sufficient to trigger the peaking amplifier, then the peaking amplifier generates an output pulse which is adequate to guarantee the triggering of *both* of the driven circuits. Whereas if the original signal is too weak to trigger the peaking amplifier, then neither of the driven circuits will be triggered, as explained below.

Referring to the logical circuit of the subtractor 32, FIG. 4, if during any clock interval there is an (A) pulse, line 31, but no (R) pulse, line 30, then the difference (A)−(R) is equal to +1 and we desire an output pulse on the (+W) line 34 but no output pulse on the (−W) line 33. If conversely there is an (R) pulse but no (A) pulse, then the difference (A)−(R) is equal to −1 and we desire an output pulse on the (−W) line 33 but no output pulse on the (+W) line 34. If during a clock interval the (A) and (R) are both zero or both one, then the difference (A)−(R) will be zero and we desire no output pulse on the (+W) line 34 nor on the (−W) line 33. This is accomplished as follows.

Starting with the F1 and F2 flip-flops 42 and 43, FIG. 4, both off, if an (A) pulse, line 31 is received, the (F2) flip-flop 43 will be "set" and the (F2) output line 45 will be high. If no (R) pulse line 30 is received, the F1 flip-flop will remain off and the (F1)' output, line 58 will be high. When a clock pulse (CL) line 36 is received at "and" gate 47 while F2, line 45, which is the other input to the gate, is also high then there will be an output logical product (F2) (CL), line 49, which will trigger the peaking amplifier 51 to produce an output via line 53 to "and" gate 57 where, in the presence of an (F1)' signal line 58, it will produce an output pulse (+W), line 34. Since the prime signal (F2)' line 59 will be low under these conditions, there will be no output (−W) line 33. Thus the circuit satisfies the requirements for A=1 and R=0. And since the circuit is symmetrical it will likewise satisfy the requirements for A=0 and R=1. Let us now consider the conditions when A=1 and R=1: both the (F1) and (F2) flip-flops 42 and 43 will be "set." Hence (F1)' line 58 and (F2)' line 59 will both be low and consequently there can be no output, line 34, from "and" gate 57, nor can there be an output (−W), line 33, from the "and" gate 56. Thus the performance satisfies the given conditions. For the conditions when A=0 and R=0, the (F1) and (F2) flip-flops will both be off and the normal (F1) and (F2) signals, lines 44 and 45, will both be low. Thus there can be no output lines 48 and 49 from the "and" gates 46 and 47, nor from the peaking amplifiers 50 and 51, nor from the "and" gates 56 and 57. Hence, as required, there will be neither (−W) output, line 33, nor (+W) output, line 34.

If the F1 flip-flop 42 is "on" it will be zeroed via line 54 by the output of the peaking amplifier 50. This zeroing will take place as a result of the clock pulse (CL), line 36, which terminates the clock interval during which the data inputs (A) and (R), lines 31 and 30, are examined and during which the (+W) or (−W) signals, lines 34 or 33, may be generated. If the F1 flip-flop 42 is already off, there is no requirement for zeroing it.

The F2 flip-flop 43 is similarly zeroed via line 55 by the output of the peaking amplifier 51. Thus after each clock pulse (CL) conditions are readied for a new clock interval examination of the inputs. One point needs further explanation: If the clock pulse (CL), line 36 occurs just as an input signal turns its flip-flop on, the logical product of the clock pulse and the normal flip-flop output may not be sufficient to trigger the related peaking amplifier, thus the received original input cannot be effective in producing a (+W) or (−W) output and at the same time cannot be effective to zero the flip-flop in question. This is as desired, since the flip-flop in question will then be adequately examined during the following clock interval. It is for these reasons that the peaking amplifiers 50 and 51 are used and also that the clock signal generator 35 of FIG. 2 is specified to produce an output pulse rate (CL) line 36 having a frequency higher than that of either of the data signals (A) line 31 or (R) line 30. It may be noted also, at this point, that a (+W) signal, line 34, and a (−W) signal, line 33, never occur at the same time. Because of this fact the logical circuit requirements for the accumulator and drive control 38 of FIGS. 3 and 5 are simplified.

It may be noted here that the (+W) and (−W) signals, lines 34 and 33 from the subtractor 32, may be used directly as inputs to a wide variety of computation, control, or data processing systems since these signals have repetition rates or frequencies proportional to the rotational velocity of the craft in the positive or negative directions.

One particular system which utilizes these signals is further specified beginning with reference to FIG. 3. The positive and negative rotation signals (−W) line 33 and (+W) line 34 are supplied to the accumulator and drive control 38 which also receives a synchronizing clock input (CL) via line 37 from the clock signal generator 35 of FIG. 2. The accumulator and drive control 38 consists primarily of an "up-down" counter which counts (+W) pulses in the positive direction and (−W) pulses in the negative direction. The content of the counter thus indicates the magnitude of angular displacement of the craft from its original reference or null position. The sign (plus or minus) of the displacement is also registered and utilized to control the actuator 41 which also receives a separate control signal when the content of the accumulator is zero. When the accumulated displacement is positive the (+S) signal, line 39, is high and causes the actuator to produce a drive in the negative direction to cancel the positive displacement. As the craft or instrument platform 113 of FIG. 13 is driven in the negative direction (−W) pulses are generated and cause the content of the accumulator to be reduced toward zero. When the content of the accumulator reaches zero, the zero signal output, line 60, is high and activates the brake of the actuator to halt the drive. The converse operations take place when the original displacement is negative. For the detailed operation of the accumulator and drive control 38 reference may be made to FIGS. 5, 6, 7, 8, 9 and 10.

Referring to the block diagram of FIG. 5, the accumulator and drive control 38, discussed briefly in reference to FIG. 3, is now seen to consist of three main sections. The magnitude counter circuit 70 simply accumulates the magnitude of the displacement regardless of the sign of the displacement. The sign trinary circuit registers the sign of displacement as positive, negative, or "zero" if there is no displacement. The input switching circuit 69 serves the function of generating "increase" (INCR) pulses line 65 when the sign of the displacement is positive or zero and (+W) pulses are received, or when the sign of the displacement is negative or zero and (−W) pulses are received. Conversely "decrease" (DECR) pulses lines 66 and 67 are generated when the sign of the displacement is negative and (+W) pulses are received, or when the sign of the displacement is positive and (−W) pulses are received. These (INCR) and (DECR) pulses are supplied by lines 65 and 66 to the magnitude counter 70 to cause the increase or decrease of its contents. The clock signal (CL) line 37 from the clock signal generator 35 of FIG. 2 is supplied to both the magnitude counter circuit 70 and the sign trinary circuit 71 for synchronization purposes.

It may be noted here that the term "positive or zero"

used above is equivalent to "not negative" or $(-S)'$. Likewise "negative or zero" is equivalent to "not positive" or $(+S)'$. Referring to FIG. 5, it is seen that these two propositions $(-S)'$ line 121 and $(+S)'$ line 120 are fed back to the input switching circuit. It will be seen later in reference to FIGS. 7 and 8 that $(-S)'$ equals $e$ and $(+S)'=d'$, since $(-S)=e$ and $(+S)=d$.

To obtain an understanding of the detailed logical operation of the circuits of the accumulator and drive control of FIG. 5, reference may be made to FIG. 6 which gives the input-output relations of the input switching circuit 69 FIG. 5, to FIG. 7 which shows the general method of counting and sign indication of the magnitude counter 70 and the sign trinary circuit 71 of FIG. 5, and to FIGS. 8 and 9 which give the logic equations for the required logic circuits. The input switching circuit 69 of FIG. 5 consists of a logic network shown in more detail in FIG. 10. The magnitude counter circuit 70 of FIG. 5 is a binary "up-down" counter further indicated in FIG. 11. The sign trinary circuit 71 of FIG. 5 consists primarily of two flip-flops as shown in FIG. 12 and is used to indicate the three conditions: "plus," "zero," and "minus."

Referring first to FIG. 7, it will be seen that for each of the values shown in the first or "number" column (No.) there are specified in the next three columns the states of the magnitude counter stages $a$ 91, $b$ 92, and $c$ 93 of FIG. 11. The next column headed $+/0/-$ simply indicates the desired sign to be expressed by the sign trinary circuit 71 of FIGS. 5 and 12. The desired states of the $d$ and $e$ flip-flops 107 and 108 of the sign trinary circuit 71 of FIG. 12 are shown in the next two columns of the table of FIG. 7. The next four columns headed $(-W)$, $(+W)$, (INCR) and (DECR) contain arrows showing the direction of change which results from inputs corresponding to the column headings.

It is thus seen, for example, that the value of "one" is represented by (1, 0, 0) for $a$, $b$ and $c$ respectively; "seven" is represented (1, 1, 1); "zero" is represented by (0, 0, 0) etc. A "plus" value is represented by (1, 0) for $d$ and $e$ respectively; a "minus" value by (0, 1), and a "zero" value by (0, 0). Thus as far as sign is concerned $d$ equals "plus," $e$ equals "minus" and $d'e'$ equals "zero." It also follows and $e'$ equals "not minus" which is equivalent to "zero or plus" and $d'$ equals "not plus" which is equivalent to "zero or minus." The reason that a trinary indication has been chosen using zero as neither plus or minus, rather than a binary indication with zero considered as positive, is to improve and simplify the control of the actuator. By the means chosen, a "plus" value gives a negative drive, and a "minus" value gives a positive drive, whereas a "zero" value gives no drive at all and instead activates a brake. If only a binary control had been employed, the drive would have had to oscillate around zero rather than simply come to rest at zero.

The table of FIG. 6 gives the input-output relations of the input switching circuit 69 of FIGS. 5 and 10 and is derived from the last four columns and the $+/0/-$ column of FIG. 7. Thus, for example, a $(-W)$ pulse in the presence of a "minus" sign $(-S)$ or a "zero" sign results in an increase (INCR) signal, and also a $(+W)$ in the presence of a "plus" sign $(+S)$ or a "zero" sign results in an increase (INCR) signal. Whereas a $(-W)$ and a $(+S)$ or a $(+W)$ and a $(-S)$ results in a decrease (DECR) signal.

Equation 4 of FIG. 8 is the Boolean or logical equation for the increase (INCR) signal as defined above. Note, however that "not plus" $(+S)'$ has been substituted for "minus or zero," and "not minus" has been substituted for "plus or zero." This substitution simplifies the switching logic circuits, since $(+S)'$ is equivalent to $d'$ and $(-S)$ is equivalent to $e'$ whereas "plus or zero" would be $(d+d'e')$ and minus or zero would be $(e+d'e')$. The logical identity above is true because the proposition $(de)$ never occurs.

It may be noted here that in Boolean or logical expressions a "+" symbol stands for the "inclusive or" or "and/or." A product such as "$de$" stands for the conjunction of $d$ "and" $e$. A prime (') stands for "not." Circuit-wise these above symbols stand for "or" circuits, "and" gates, and the "prime" output of a flip-flop in contradistinction to the "normal" or "un-primed" output of the flip-flop. The "prime" symbol sometimes is used also to indicate the use of an inverter. "And" and "or" circuits are well known to the art as diode circuits, relay circuits, transistor circuits or vacuum tube circuits. Flip-flops of the two-input-two-output type, as discussed earlier also are commonly used in digital computers. The notation used throughout this specification is generally understood in the digital computer design field.

Equation 5 of FIG. 8 is the decrease (DECR) signal equation. In both Equations 4 and 5, which represent the input switching circuit 69 of FIGS. 5 and 10, the substitutions for $(-S)=e$, $(+S)=d$, $(-S)'=e'$ and $(+S)'=d'$ have been made. These signals come from the sign trinary circuit 71 of FIGS. 5 and 12 via lines 62, 61, 121, and 120 respectively. The inputs $(-W)$ line 33 and $(+W)$ line 34 are supplied by the subtractor 32 of FIGS. 2 and 4.

FIG. 10 is the detailed logical circuit for the input switching circuit 69. The "and" gates 72, 74, 76 and 78 produce the output logical products respectively $(d)'(-W)$ line 73, $(e)'(+W)$ line 75, $(e)(+W)$ line 77, and $(d)(-W)$ line 79. Lines 73 and 75 provide the inputs to "or" circuit 80 whose output line 65 provides the (INCR) signal specified by Equation 4 of FIG. 8. Lines 77 and 79 provides the inputs to the "or" circuit 81 whose output, lines 66 and 67, provides the (DECR) signal specified by Equation 5 of FIG. 8.

The Equations 11, 12, 13, 14, 15 and 16 of FIG. 9 give the logical propositions for setting and zeroing the flip-flops $a$, $b$, and $c$ of the magnitude counter circuit 70 of FIG. 5 which is further detailed in FIG. 11. This circuit 70 is simply a binary "up-down" counter having its inputs respectively the (INCR) and (DECR) signals lines 65 and 66.

All stages of this type of up-down counter are the same except that the inputs to each of the higher stages are provided by the preceding stage, so in FIG. 11 only the first stage 91 has its logical circuitry shown in detail.

In FIG. 11, "and" gates 82 and 83, produce respectively the propositions $(a')$ (DECR) and $(a')$ (INCR) which are supplied to "or" circuit 86 whose output, $(a')$ (INCR)+$(a')$ (DECR), which corresponds to Equation 11 of FIG. 9, is "clocked" in "and" gate 88 whose output sets flip-flop "$a$" 90 at its set $(s)$ input. Similarly the clocked proposition $(a)$ (INCR)+$(a)$ (DECR), corresponding to Equation 12 FIG. 9, zeros flip-flop "$a$" 90 at its zero input $(z)$. This signal, of course, is generated through "and" gates 84, 85 and 89 and "or" circuit 87. The normal and prime outputs, $(a)$ and $(a)'$ respectively, of flip-flop "$a$" 90 are fed back to the input net as shown. The clock (CL) input 37 is supplied by the clock signal generator 35 of FIG. 2. The (INCR) and (DECR) signals, 65 and 66, are supplied by the input switching circuit 69 of FIGS. 5 and 10. The outputs of "and" gates 82 and 85, $(a')$ (DECR) and $(a)$ (INCR) respectively, are supplied by lines 94 and 95 to the "$b$" stage 92 as its inputs, thus providing the bracketed terms in Equations 13 and 14 of FIG. 9. Lines 96 and 97 serve similarly to provide the carry signals from the "$b$" stage 92 to the "$c$" stage 93.

The propositions $a$, $b'$ and $c'$ lines 98, 99 and 100 provide the inputs to "and" gate 101 whose output $ab'c'$ is the "one" signal, Equation 8 of FIG. 8, carried by line 68 to the sign trinary circuit 71 of FIGS. 5 and 12.

The sign trinary circuit 71 shown in detail FIG. 12 derives inputs as follows: (+W) 63 and (−W) 64 as shown in FIG. 5 branching from lines 34 and 33 from the subtractor 32 of FIGS. 2 and 4; (DECR) 67 from the input switching circuit of FIGS. 5 and 10; (ONE) 68 from the magnitude counter circuit 70 of FIGS. 5 and 11; and the clock signal (CL) line 37 from the clock signal generator 35 of FIG. 2.

The "and" gates 102, 103, 104 and 105 respectively provide the clocked propositions for Set $d$=(zero) (+W), Equation 6, FIG. 8,
Zero $d$=(one) (DECR), Equation 9, FIG. 8,
Set $e$=(zero) (−W), Equation 7, FIG. 8,
Zero $e$=(one) (DECR), Equation 10, FIG. 8.

The normal and prime outputs of the "$d$" flip-flops 107, $d$ and $d'$, lines 39 and 120 are respectively equal to the (+S) and (+S)' signals, Equation 2, FIG. 8. The $e$ and $e'$ outputs of the "$e$" flip-flop 108 are respectively equal to the (−S) and (−S)' signals lines 40 and 121, Equation 1, FIG. 8. Also $d'$ and $e'$ via lines 110 and 111 go to "and" gate 106 whose output $d'e'$=zero is fed back line 109 to the input gates 102 and 104. The zero signal, via line 60 is also supplied to the actuator 41 of FIGS. 3 and 13. To this actuator are fed also the sign trinary outputs (+S) 39 and (−S) 40.

The actuator 41 of FIG. 3, now shown in more detail in FIG. 13, consists mainly of a drive power unit 119, which may for example be a reversible electric motor with an electric brake, a reverse drive control relay 116 responsive to a (+S) 39 input signal to cause the drive power unit to run in its reverse direction, a forward drive control relay 118 responsive to a (−S) 40 signal to cause the drive power unit to run in its forward direction, a braking control relay 117 responsive to a (zero) 60 signal to brake the drive power unit to stop its motion, and an output platform drive connection 112 which connects to the instrument platform 113 to cause its rotation to compensate for rotation of the craft about an axis parallel to that of the scanning mechanism 11.

On the rotatable instrument platform is mounted the scanning mechanism 11 (including the push-pull amplifier 22 not shown) of FIG. 1. The instrument cable 114 provides input for necessary power supply to the scanning mechanism as well as output for the data signals needed for the system's overall operation. Cable 115, which comprises part of cable 114, is the power supply cable.

*Variations*

For measurement of roll or pitch velocity the cylindrical grid type instrument 11 of FIGS. 1 and 13 is suitable to easy mounting on the top of the aircraft where through openings a view of the sky above is obtained. However, the cylindrical grid type is not as suitable for measuring turn velocity since it would have to be mounted with a view either to front, rear, or side of the aircraft. Thus if the aircraft were horizontal, the instrument view centerline would point to the horizon and the instrument would view a portion of the earth, the haze of the horizon, and only a relatively small portion of the celestial sphere. For this reason an alternate grid-photocell arrangement indicated in FIG. 14 is more suitable for measuring turn velocity. In this method, disc type grids 122 and 123 of FIG. 14 are used instead of the cylindrical type grids 14 and 15 of FIG. 1.

Referring to FIG. 14, the photocells 124 and 125 which lie along the axis of rotation of grid discs 122 and 123 have a generally conical view of the celestial sphere. The axis of this cone lies along the axis of rotation of the grids. The alternate radial opaque and transparent bands 252, 253 of the grids divide up the cone of view into alternate radial sections, and since one grid is off-set from the other, the sections viewed at a given instant by one photocell are invisible at the time to the other photocell. This off-set is illustrated by the beams 126 and 127 of FIG. 14 which are off-set from each other.

As with the scanning mechanism 11 of FIGS. 1 and 13, the grids are driven at equal speeds measured by a digitizer. The photocell outputs are fed to a push-pull amplifier whose output enters a subtractor like subtractor 32 of FIG. 2, whose other input is the output from the drive speed digitizer. The difference signals generated thus represent turn velocity.

A turn velocity instrument may also use concentric grid arrangements using an inner band of strips surrounded by an outer band of off-set strips. The arrangement may be either flat, conical, spherical, or other shape. FIG. 15 shows an arrangement that is in the form of a truncated cone.

The foregoing discussion has covered the use of essentially separate instruments to measure rotation around three separate axes. Obviously it is advantageous to be able to use a single instrument which will give sufficient information to indicate rotation about three coordinate axes. Such an instrument is discussed in reference to FIGS. 15, 16 and 17. In this system a single truncated conical grid 128 of FIG. 15 having two sections 129 and 130 mutually off-set is used. This grid is rotated around vertical Y axes 131 of FIGS. 15 and 17. Four windows K, L, M, and N respectively 134, 135, 136 and 137 of FIG. 17 are provided in positions generally above the grid as shown. On the opposite side of the grid from the windows are provided four photocell pairs generally below and toward the axis of rotation of the grid. One arrangement of a photocell pair with respect to the grid is shown in FIG. 16. Here the photocells 132 and 133 are mounted at the right angles of right triangles whose hypotenuses are respectively the radii of the upper and lower sections 129 and 130 of the grid 128. The plane of said right triangles includes the vertical Y axes of rotation 131. The reason for the above positioning of the photocells will be explained later. In general, however, it is seen that the lines of view from the photocells through grids and windows are at an angle of 45 degrees from the vertical axis of rotation.

Referring to FIG. 17, if the instrument is aligned so that the X axis 138 represents the fore-and-aft axis of the craft, roll velocity is to be measured about this axis. If the Z axis 139 is the right-left axis of the craft, pitch velocity is to be measured about this axis. If the Y axis 131 is the vertical axis of the craft, turn velocity is to be measured about this axis. For convenience we will designate window K 134 as the front window, window L 135 as the rear window, window M 136 as the right window, and window N 137 as the left window. The beams through these windows will make angles of 45 degrees with the vertical axis Y 131 and will be oriented respectively to the front, rear, right and left.

In the following, the symbol $l$ as applied to a signal represents the letter "ell."

The arrows on the grid arrangement 128 of FIG. 17 show the direction of the grid drive rotation. Signals from the K, L, M, and N windows which add to the drive will be designated $+k$, $+l$, $+m$, and $+n$ respectively. Signals which subtract from the drive will be designated as $-k$, $-l$, $-m$ and $-n$.

Thus a turn to the left will produce signals $+k$, $+l$, $+m$, and $+n$. A turn to the right will produce $-k$, $-l$, $-m$, and $-n$.

A roll clockwise from pilot's viewpoint or right wing down will produce signals $-k$ and $+l$. A counterclockwise roll, direction of arrow 140 (left wing down) will produce signals $+k$ and $-l$. However, roll alone will produce no $m$ or $n$ signals.

A pitch, direction of arrow 141 (nose down) will produce signals $+m$ and $-n$, whereas a climb (nose up) will produce signals $-m$ and $+n$, but these motions alone will produce no $k$ or $l$ signals.

Left turn will be considered positive ($+t$); counterclockwise roll, direction of arrow circle 140 (left wing down), positive ($+r$), and pitch, direction of arrow circle 141

(nose down), will be considered positive (+p), as indicated by arrows around the X, Y, and Z axes in FIG. 17.

The $k$, $l$, $m$, and $n$ signals represent the difference signals produced *after* the signals due to the grid drive have been subtracted from the total signals generated by the photocells, thus, they represent craft rotation as viewed through their respective windows; hence we have the following preliminary equations:

$$+t=+k \quad -t=-k$$
$$+t=+l \quad -t=-l$$
$$+t=+m \quad -t=-m$$
$$+t=+n \quad -t=-n$$

hence $$+4t=+k+l+m+n$$
$$+t=\frac{+k+l+m+n}{4}$$

likewise $$-t=\frac{-k-l-m-n}{4}$$

also $$+r=+k \quad -r=-k$$
$$+r=-l \quad -r=+l$$

hence $$+2r=+k-l$$
$$+r=\frac{+k-l}{2}$$

likewise $$-r=\frac{-k+l}{2}$$

and also $$+p=+m \quad -p=-m$$
$$+p=-n \quad -p=+n$$

hence $$+2p=+m-n$$
$$+p=\frac{+m-n}{2}$$

and likewise $$-p=\frac{-m+n}{2}$$

Since the $k$, $l$, $m$, and $n$ signals are carried on pairs of lines and one of each pair represents plus values while the other represents minus values, and since the minus line signal is zero when the signal is plus and the plus line is zero when the signal is minus, it can be seen that addition of positive and negative values cannot be accomplished by straight addition of the rates in question. Instead, the plus rates must be added separately; the minus rates must be added separately, and then the minus total must be subtracted from the plus total.

Thus the signals actually used within the computing circuits are not conventional variables which may have magnitude and sign but merely signals having magnitude only. Thus $+k$ and $-k$ in the computing circuitry merely represent the signal frequencies on different lines. These frequencies can, of course, never drop below zero. Thus we obtain the following computing circuit equations:

$$(+t)=\frac{[(+k)+(+l)+(+m)+(+n)]-[(-k)+(-l)+(-m)+(-n)]}{4}$$

$$(-t)=\frac{[(-k)+(-l)+(-m)+(-n)]-[(+k)+(+l)+(+m)+(+n)]}{4}$$

$$(+r)=\frac{[(+k)+(-l)]-[(-k)+(+l)]}{2}$$

$$(-r)=\frac{[(-k)+(+l)]-[(+k)+(-l)]}{2}$$

$$(+p)=\frac{[(+m)+(-n)]-[(-m)+(+n)]}{2}$$

$$(-p)=\frac{[(-m)+(+n)]-[(+m)+(-n)]}{2}$$

where left turn $=(+t)$; right turn $=(-t)$; roll (left wing down) $=(+r)$; roll (right wing down) $=(-r)$; pitch (nose down) $=(+p)$; pitch (nose up) $=(-p)$.

One means of generating the desired roll, pitch and turn signals is discussed in reference to FIG. 27, parts of which are further detailed in FIGS. 28, 29 and 30. In this system a grid (like 128 of FIG. 15) is used with photocells 161 (like 132 and 133 of FIG. 16). A digitizer 162, like 13 of FIG. 1, is used to measure the grid drive speed. The output from the digitizer is amplified and squared by amplifier 165 to produce the signal R 166 which has a frequency proportional to the scanner drive speed. The scanner windows K, L, M and N 163 (like 134, 135, 136 and 137 of FIG. 17) are respectively front, rear, right and left windows.

The K, L, M, and N signal circuits 169, 170, 171, and 172 of FIG. 27 serve the purpose of generating the plus and minus difference signals 199 and 201 (like $+W$ and $-W$, 33 and 34 of FIG. 2) and their primes 200 and 202, and corresponding signals for the other windows. These signals represent rotation of the craft with respect to each of the scanner windows, being the differences, plus and minus, between the photocell output frequencies and the digitizer output frequency. The primes are generated because they are needed, as well as the normal signals, for inputs to the averaging circuits 174, 175, 176, 177, 181, 182, 184 and 185.

A clock signal generator 164 (like 35 of FIG. 2) supplies synchronizing clock pulses via line 198 to all circuits requiring synchronization although the actual connections are omitted for clarity.

The outputs of the K, L, M and N signal circuits are supplied via cable 173 to the averaging circuits 174, 175, 176, 177, 181, 182, 184, and 185.

Averaging circuit 174 produces an output which is the average of the $(+k)$ and $(+l)$ inputs or $$\frac{(+k)+(+l)}{2}$$

the prime of this signal is also produced:

$$\left[\frac{(+k)+(+l)}{2}\right]'$$

The averager 175 produces $$\frac{(+m)+(+n)}{2}$$

and $$\left[\frac{(+m)+(+n)}{2}\right]'$$

These above two averages and their primes are provided as inputs to the averager 178 which thus produces the average $$\frac{(+k)+(+l)+(+m)+(+n)}{4}$$

and its prime.

Likewise averagers 176, 177 and 179 produce $$\frac{(-k)+(-l)+(-m)+(-n)}{4}$$

and its prime.

The differences, plus and minus, of these two averages are produced by the subtractor 180 and constitute the $(+t)$ 187 and $(-t)$ 188 signals required for turn indication.

In similar manner the circuits 181, 182 and 183 produce the roll signals 189 and 190, while circuits 184, 185 and 186 produce the pitch signals 191 and 192. Thus the computer requirements are satisfied in accordance with our previous equations. The signal circuits, averagers, and subtractors will now be explained in more detail.

FIG. 28 shows the K signal circuit 169 of FIG. 27 in more detail. It will be noted that this circuit is similar to the circuits of FIGS. 1 and 2.

The K window photocell outputs, KP1 and KP2, are supplied via lines 167 and 168 to the push-pull amplifier 193 (like 22 of FIG. 1) whose output is shaped by squaring amplifier 194 (like 29 of FIG. 2) and supplied as one signal input to the subtractor 195 (like 32 of FIG. 2).

This signal represents the total rotation with respect to the K window being partly due to the rotation of the craft and partly due to the grid drive. The R signal 166, already squared by amplifier 165, is proportional to the grid drive speed and is supplied to the other data input of the subtractor 195. The subtractor outputs are $+k$, 199 and $-k$, 201, representing respectively the photocell output frequency minus R, and R minus the photocell output frequency. (The $+k$ and $-k$ signals are analogous to the $-W$ and $+W$ signals 33 and 34 of FIG. 2.) Since we will need the primes of these signals the inverters 196 and 197 are used to produce the primes $+k'$ and $-k'$, 200 and 202 respectively. These inverters may be any of a large number of types known to the electronic art. The clock signal 198 is also supplied to the subtractor 195 for synchronization purposes.

The L, M, and N signal circuits 170, 171, 172 are like the K signal circuit 169 described above.

The averaging circuit 174 of FIG. 27 is further detailed in FIG. 29 and operates to produce an output pulse rate which is the average of two input pulse rates. Actually, the primes of the input signals are also used and the prime of the output also is generated for later use.

To more easily understand the averager 174, reference may be first made to the output line 221 of the "or" circuit 219 of FIG. 29. There will be an output on line 221 if one or more of the inputs to the "or" circuit are "on." In other words, if $+k$ and $+l$ are high, the average 221 will be high. Likewise, if $+k$ and $f3$ are high, or if $+l$ and $f3$ are high then the average 221 will be high. Thus the logical Boolean equation for the average output 221 is $$Av(+k, +l) = (+k)(+l) + (+k)(f3) + (+l)(f3)$$

From the above equation we get the equation for the prime output 222 which is $$Av'(+k, +l) = (+k)'(+l)' + (+k)'(f3)' + (+l)'(f3)'$$

which is seen to be formed by the "or" circuit 220 and the "and" gates 216, 217, and 218 just as the former equation signal was produced by "or" circuit 219 and "and" gates 213, 214, and 215.

From the above it is seen that when both inputs have a pulse, that is $(+k)(+l)$, we have a single output through "and" gate 213. When neither inputs have a pulse, that is $(+k)'(+l)'$, we have a *prime* output through "and" gate 216. In other words, we have the correct average of unity for *two* inputs, and of *zero* for *no* inputs. However, if the inputs differ, that is $(+k)(+l)'$ or $(+k)'(+l)$, we have only unity input and the output should be ½. Since a ½ pulse cannot be used we must store the ½ count in flip-flop F3 210. The next ½ count that occurs will result in an output via gates 214 and 215 and will reset the flip-flop F3 210 to zero. Thus we see that whenever the inputs are different, the flip-flop changes states, but on half of its changes it produces an output pulse via "and" gates 214 or 215 and on the other half it produces the prime output pulses through "and" gates 217 and 218.

In detail, the logical expressions for the outputs of circuits affecting the flip-flop 210 are as follows:

"And" gate 203: $(+k)(+l)'$
"And" gate 204: $(+k)'(+l)$
"Or" circuit 205: $(+k)(+l)' + (k)'(+l)$ "And" gate 206 = set $f3$, line 208 = $[(+k)(+l)' + (+k)'(+l)](f3)'(CL)$
"And" gate 207 = zero $f3$, line 209 = $[(+k)(+l)' + (+k)'(+l)](f3)(CL)$ The normal and prime flip-flop outputs $(f3)$ and $(f3)'$ are provided by lines 211 and 212 respectively, and the synchronizing clock signal CL is supplied via line 198.

FIG. 30 shows more detail of the subtractor 180 indicated generally in FIG. 27. This subtractor is relatively simple since its inputs are already synchronized.

When $Av(a) =$ unity, and $Av(b) = 0$ then $$Av(a) - Av(b) = \text{unity}$$

Since when $Av(b) = 0$, $Av'(b) =$ unity, it follows that with two inputs of unity to "and" gate 227, it produces the desired output difference 229 for the signals on inputs 223 and 224, this desired difference being, namely, an output signal when the difference between $Av(a)$ and $Av(b)$ is unity.

Conversely for the negative difference line 230, or $Av(b) - Av(a)$, the gate 228 generates the correct output 230 for the input lines 225 and 226.

It may be noted here that the subtractors 183 and 186 of FIG. 27 are the same as 180 of FIGS. 27 and 30, but these are different from subtractor 195 of FIG. 28 which is like subtractor 32 of FIG. 2.

It may also be noted that all the averagers 175, 176, 177, 178, 179, 181, 182, 184 and 185 of FIG. 27 are like averager 174 of FIGS. 27 and 29.

Returning to FIG. 16, the placement of the photocells 132 and 133 will be explained.

The grid 128 rotates about the vertical Y axis 131 at a rotational velocity which we will call (W1). The centerpoint A on upper section 129 of grid 128 is at a distance (R1) from the axis of rotation 131. Therefore the *linear* velocity at point A is $$(Va) = (W1)(R1)$$

and similarly the *linear* velocity at point B is $$(Vb) = (W1)(R4)$$

However, the photocells 132 and 133 are located at points B and E and the angular velocity respectively of the grids around the photocells are $$(W2) = \frac{(Va)}{(R2)} = \frac{(W1)(R1)}{(R2)}$$

and $$(W3) = \frac{(Vb)}{(R5)} = \frac{(W1)(R1)}{(R5)}$$

But since the triangles ABC and DEF are 45 degrees or isosceles right triangles it follows that $$(R2)^2 + (R3)^2 = (R1)^2$$

but $$(R2) = (R3)$$

hence $$2(R2)^2 = (R1)^2$$

or $$(R2) = (R1)/\sqrt{2}$$

and hence $$(W2) = \frac{(W1)(R1)}{(R1)/\sqrt{2}}$$

or $$(W2) = \sqrt{2}(W1)$$

and likewise $$(W3) = \sqrt{2}(W1)$$

For other positioning of the photocells, the constant of proportionality will be different than the square root of 2, but the present arrangement suffices for the purpose of illustration.

We will now consider more specifically the placement of scanning mechanisms and windows in aircraft or missiles.

In FIG. 18 is shown an arrangement for measuring angular motion in three coordinates. Scanning mechanism 142, viewing through a window in the top of the aircraft, measures *roll*. Scanning mechanism 143, set cross-wise to 142, also viewing through a window in the top of the aircraft, measures *pitch*. Scanning mechanism 144, set vertically and viewing through a window in the front of the craft, measures *turn*. The scanning mechanisms 142, 143, and 144 are mutually perpendicular and each like 11 of FIG. 1.

In FIG. 19 we see scanning mechanisms 145 and 146 used respectively like 142 and 143 of FIG. 18, but here the scanning mechanism 147 (like 148 of FIG. 14) is used to measure *turn* by viewing through a window in the top of the craft and thus obtaining a better view of the stars than could be attained by scanning mechanism 144 of FIG. 18.

FIG. 20 indicates a single combination scanning mechanism 149 (like that discussed in reference to FIGS. 15, 16, and 17) for measuring angular motion around three axes by viewing through a window or windows in the top of the aircraft.

FIG. 21 shows an example of the use of four windows 150, corresponding to K, L, M, N of FIG. 17, in the top of the aircraft.

FIG. 22 shows a scanning mechanism 151 mounted in a gimbal arrangement 152 to permit rotation about three axes.

FIG. 24 shows a scanning mechanism 155 as it might be mounted in the nose of a missile 154 so as to view through a transparent section of the missile nose.

FIG. 23 shows a double combination scanning mechanism 153, employing two coaxial units like FIGS. 15 to 17 back-to-back, for measuring rotation about three axes. This arrangement would be suitable for a satellite or vehicle which might tumble in space in such a way that it would present different viewing windows toward the stars at different times. It would also suffice where a satellite which is stabilized to maintain a generally fixed orientation in space as it travels about the earth (or other body) must view the heavens always on the side where the view is not obscured by the earth. In this system, eight signals would be selectively used in a computation system similar to that shown in FIG. 27.

FIG. 25 shows an arrangement similar in function to that of 153 of FIG. 23. Here two oppositely facing coaxial scanners 157 and 158 are mounted on top and bottom (or opposite sides) of a missile 156 so that sufficient star scanning may be obtained regardless of the rotation of the missile 156 or its position relative to the earth.

FIG. 26 illustrates the use of the invention as an instrument mounted on the ground to detect and measure angular motion relative to the earth. In the illustration of FIG. 26, an arrangement 159 of two scanning mechanisms (like 11 of FIG. 1), arranged with their axes mutually perpendicular, i.e., north-south and east-west, is mounted on the earth. Any object having sufficient contrast to the general field of view and moving therein so as to have a component transverse to the line of view will produce signals representative of the angular motion with respect to the instrument. The vector sum of the north-south and the east-west components will be the true vector of angular motion both as to magnitude and direction, as shown in vector representation 160.

In reference to FIG. 26, the measured motion may be, for example, that of a missile, projectile, or aircraft. On the other hand, the object of view may be the stars themselves in which case the instrument will measure the angular velocity and direction of the earth's rotation. In this case, the instrument may be used to determine true compass directions since it is known that the earth rotates from west to east. Also, it is known that the earth rotates 360 degrees in 24 hours, and hence the scanning mechanism signal may be used as an accurate frequency standard since it measures rotation in degrees or parts of degrees. In this sense, it may be used to accurately determine time intervals without need of other sources of information such as radio time signals or precision clock mechanisms.

It is to be understood that from this specification, engineering refinements and system details of standard practice have been omitted for the sake of clarity. It should also be understood that the gimbal system like the single platform system may be motor driven to maintain its stability about all three axes. Also, both the single platform system and the gimbal system may incorporate shaft position pickoffs to indicate the instrument mounting orientation relative to the craft. This indication in turn may be used for information or control. The gimbal system may also use accumulators to count rotation increments about all three axes.

I claim:

1. The method which comprises rotating a grid, subjecting the rotating grid to bodily angular movement and to illumination from celestial space, thereby producing light interruptions having a frequency dependent on rotation of said grid as modified by said angular movement.

2. The method according to claim 1 which comprises translating said light interruptions into a signal, producing a reference signal having a frequency independent of said angular movement, and comparing said first signal with said reference signal and thereby producing an output signal representative of said angular movement.

3. The method according to claim 2, translating said output signal into a control, and controlling said angular movement in accordance with said control.

4. The method according to claim 2, said output signal being representative of the magnitude and sign of said angular movement.

5. The method which comprises rotating a grid, subjecting the rotating grid to a bodily angular movement with reference to an axis and to illumination from celestial space, thereby producing light interruptions having a frequency dependent upon said first movement of said first mentioned grid as modified by said bodily angular movement.

6. The method which comprises rotating a grid, subjecting the rotating grid to bodily angular movement with respect to three mutually perpendicular axes and to illumination of celestial space and thereby producing a three coordinate array of light interruptions having frequencies dependent on rotation of said grid as modified by its angular movement about each of said axes respectively.

7. An instrument for measuring rotation having in combination two grids and two photocells so arranged as to permit alternate strips of the celestial sphere to be visible to one photocell through one grid while said other grid is off-set from said one grid so that the intervening strips of the celestial sphere are visible to the other photocell so that as the instrument rotates the illumination of one photocell changes in opposition to the illumination of the other photocell as a result of the uneven distribution of light from celestial bodies, and a push-pull means of amplifying said photocell output so as to produce cyclic signal outputs whose frequency corresponds to the angular velocity of said instrument, and means supporting said instrument for said rotation and illumination.

8. An instrument in accordance with claim 7 in combination with a counter for counting said cyclic outputs in order to obtain a count representative of the total angular displacement of the instrument from its initial orientation.

9. An instrument for measuring rotation having in combination two photocells and two moving grids off-set from each other so that one photocell scans alternate strips of the celestial sphere while the other grid scans the intervening strips, a push-pull amplifier for amplifying the photocell outputs so as to produce a cyclic signal having a frequency proportional to the angular velocity of said grids about said photocell's axis relative to the celestial sphere, a velocity pick-off for converting the angular velocity of said grids relative to the instrument into an electrical signal, and means for subtracting the signal representing angular velocity of the grids relative to the instrument from said signal representing angular velocity of the grids relative to the celestial sphere to produce a difference signal representing angular velocity of the instrument relative to the celestial sphere.

10. Means in accordance with claim 9 wherein said velocity pick-off signal is a cyclic signal and said means for subtracting produces a difference signal whose frequency is proportional to the angular velocity of said instrument with respect to celestial sphere.

11. Means in accordance with claim 10 in combination with a counter for obtaining a count of said difference signal pulses, said count being representative of the magnitude and sign of the rotational angular displacement of said instrument from its initial orientation.

12. Means in accordance with claim 11 in combination with an actuator responsive to the sign of the rotational angular displacement of said instrument to drive said instrument back to its initial orientation.

13. Means in accordance with claim 12 in combination with a brake responsive to zero displacement as registered in said counter to brake said actuator to a stop.

14. A measuring system comprising a unit having an axis, means supporting said unit for bodily angular movement with respect to said axis, a rotary light scanner device on said axis, said scanner device comprising grid means having alternate slits and masks co-axial with said axis, and photocell means in position to receive illumination through certain of said slits which extend lengthwise of said axis in phase opposition to the other grid strips in a direction around said axis, a motor for driving said scanner device, a digitizer driven by said motor, and a receiving circuit for comparing the output of said scanner device with the output of said digitizer.

15. A measuring system according to claim 14 and means for supporting said unit in position to expose said scanner device to celestial illumination.

16. An instrument comprising a rotary scanning device having an array of slits substantially on a surface of revolution about a rotary axis, means including photocell means associated with said slits for detecting angular movement of said instrument about one of three mutually perpendicular axes one of which is coincident with said rotary axis, and means supporting said instrument for said angular movement about said one axis and in position for said scanning device to scan the celestial sphere.

17. An instrument comprising a rotary scanning device having an array of slits substantially on a surface of revolution about a rotary axis, means including photocell means associated with said slits for detecting angular movement of said instrument about a plurality of three non-coincident axes one of which is coincident with said rotary axis, and means supporting said instrument for said angular movement about said plurality of axes and in position for said scanning device to scan the celestial sphere.

18. An instrument comprising a rotary scanning device having an array of slits substantially on a surface of revolution about a rotary axis, means including photocell means associated with said slits for detecting angular movement of said instrument about each of three mutually perpendicular axes one of which is coincident with said rotary axis, and means supporting said instrument for said angular movement about each of said axes and in position for said scanning device to scan the celestial sphere.

19. A motor driven scanning device and digitizer unit, means supporting said unit with said scanning device in position for illumination by the celestial sphere and with said unit subject to rotary movement having an angular velocity with reference to the celestial sphere, a logical gating and flip-flop circuit having inputs from said digitizer and scanning device, said circuit comprising means providing an output circuit having a signal characteristic of the angular velocity of said unit with reference to the celestial sphere.

20. A motor driven scanning device and digitizer unit, means supporting said unit with said scanning device in position for illumination by the celestial sphere and with said unit subject to rotary movement having an angular velocity with reference to the celestial sphere, a logical gating and flip-flop circuit having inputs from said digitizer and scanning device, said circuit comprising means providing output circuits having signals representative of the following three states, namely the angular movement of said unit in one direction, the angular movement of said unit in the opposite direction, and an intermediate position representing no angular movement of said unit in either of said directions.

21. An instrument comprising a movable scanning device, means providing a reference signal in timed relation with movement of said scanning device, means supporting said scanning device for movement thereof with reference to the celestial sphere and for illumination of said scanning device by the celestial sphere, said scanning device producing a scanning signal as a function of its movement and that of said supporting means while said scanning device is illuminated by the celestial sphere, and a circuit for combining said reference signal and said scanning signal.

References Cited in the file of this patent

UNITED STATES PATENTS

| | | | |
|---|---|---|---|
| 2,398,238 | McNatt | | Apr. 9, 1946 |
| 2,601,281 | Hartley et al. | | June 24, 1952 |
| 2,707,524 | Montgomery | | May 3, 1955 |
| 2,733,431 | Steele | | Jan. 31, 1956 |
| 2,788,519 | Caldwell | | Apr. 9, 1957 |
| 2,789,260 | Curtis et al. | | Apr. 16, 1957 |
| 2,795,378 | Beranger | | June 11, 1957 |
| 2,811,713 | Spencer | | Oct. 29, 1957 |
| 2,828,930 | Herbold | | Apr. 1, 1958 |